United States Patent [19]
Rumpf et al.

[11] Patent Number: 5,466,427
[45] Date of Patent: Nov. 14, 1995

[54] CATALYSIS AND TREATMENT OF GASES WITH THE CATALYSTS

[75] Inventors: Frederick H. Rumpf, Billerica, Mass.; Jonathan B. Scher, Portsmouth, N.H.

[73] Assignee: Cabot Corporation, Boston, Mass.

[21] Appl. No.: 288,765

[22] Filed: Aug. 11, 1994

Related U.S. Application Data

[62] Division of Ser. No. 91,796, Jul. 14, 1993, abandoned.

[51] Int. Cl.$^6$ .................................................. B01D 53/86
[52] U.S. Cl. .................... 423/210; 423/236; 423/244.06; 423/244.10; 423/352; 423/563
[58] Field of Search ................. 423/236, 244.06, 423/244.10, 210, 563, 352

[56] References Cited

U.S. PATENT DOCUMENTS

| | | | |
|---|---|---|---|
| 3,423,194 | 1/1969 | Kearby | 423/236 |
| 3,859,415 | 1/1975 | Nicklin et al. | 423/236 |
| 4,975,255 | 12/1990 | Bowman | 423/236 |
| 4,981,661 | 1/1991 | Borsboom et al. | 423/244 |

FOREIGN PATENT DOCUMENTS

| | | | |
|---|---|---|---|
| 2733105 | 1/1979 | Germany | 423/236 |
| 53-5065 | 1/1978 | Japan | 423/236 |
| 5418466 | 2/1979 | Japan | 423/236 |

*Primary Examiner*—Gary P. Straub
*Assistant Examiner*—Timothy C. Vanoy
*Attorney, Agent, or Firm*—Lawrence A. Chaletsky

[57] ABSTRACT

This invention relates to novel cobalt and molybdenum promoted titania and nickel and molybdenum promoted titania catalysts, and molybdenum promoted titania catalysts containing mixtures of cobalt and nickel. The invention also relates to a process for using the catalysts to convert sulfur in the form of carbon sulfides and nitrogen present as hydrogen cyanide to hydrogen sulfide and ammonia respectively. The catalysts and process of the present invention are effective even when oxygen in concentrations up to about 2 volume %, preferably 1.0 volume %, (dry basis) is present. The catalyst comprises about 0.5 to about 5%, by weight, cobalt oxide (CoO), nickel oxide (NiO), or mixtures thereof; about 1.5 to about 15%, by weight, molybdenum trioxide ($MoO_3$); and about 70 to about 98%, by weight, titanium dioxide ($TiO_2$).

6 Claims, 2 Drawing Sheets

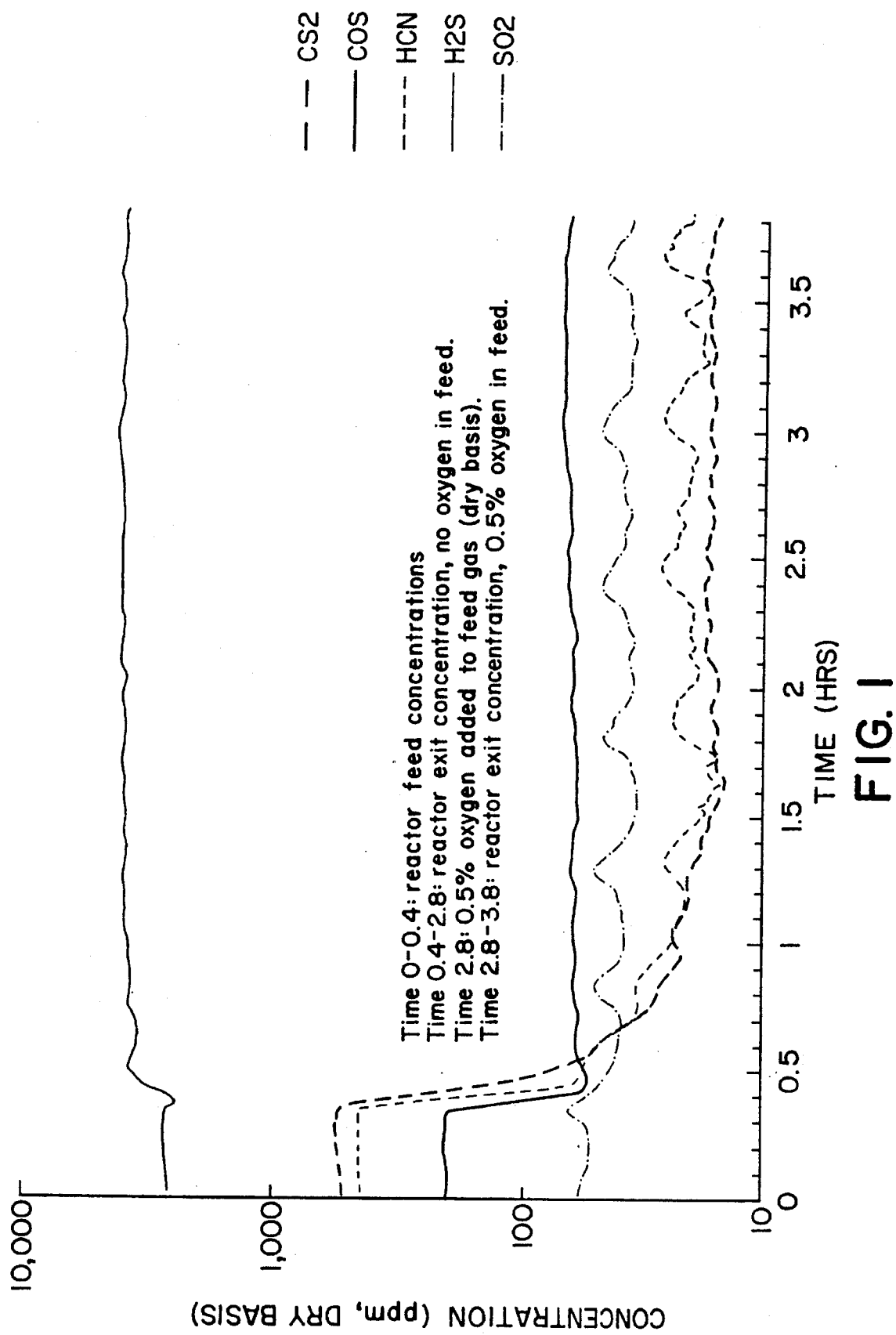

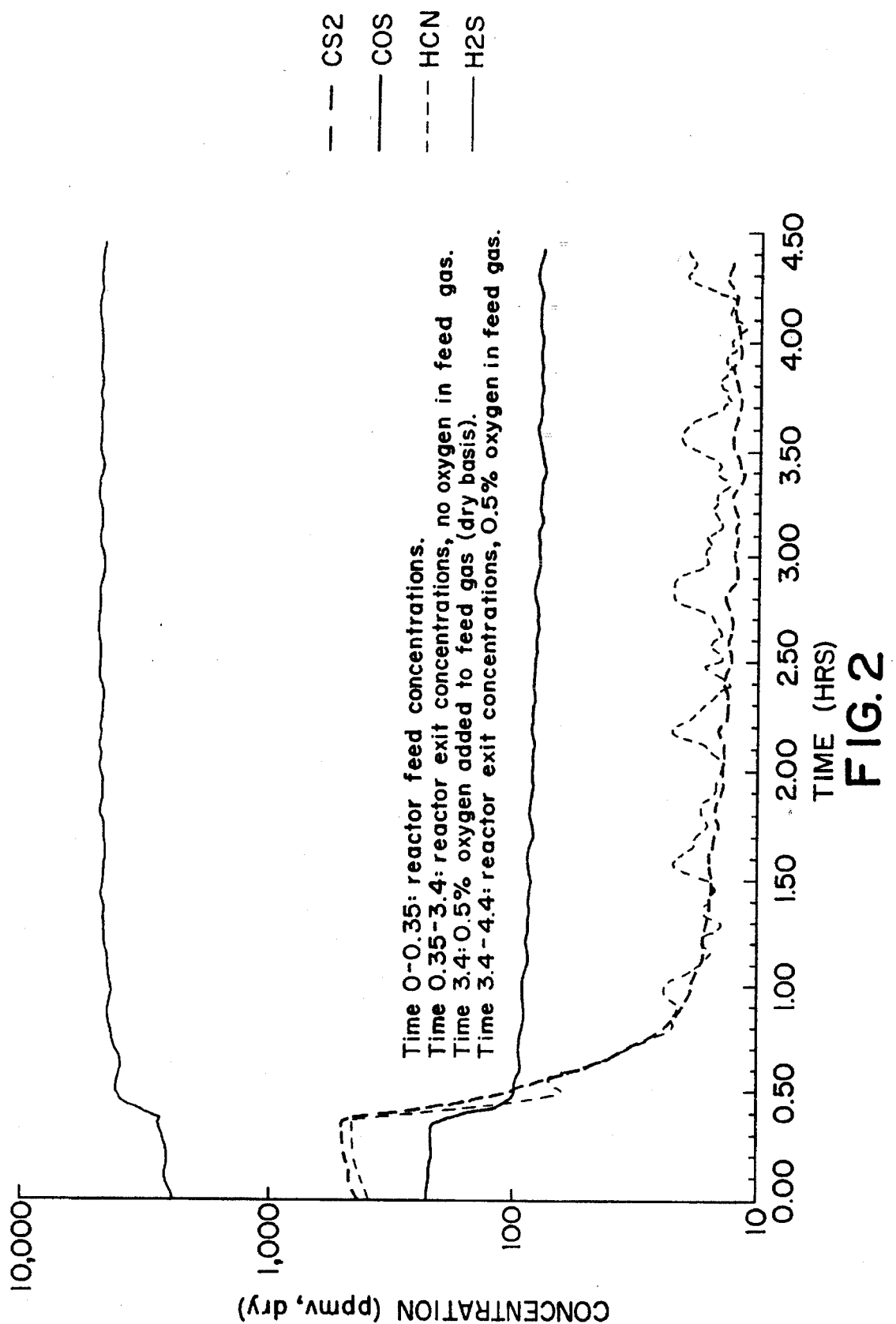

CATALYSIS AND TREATMENT OF GASES WITH THE CATALYSTS

This is a division of application Ser. No. 08/091,796 filed 14 Jul. 1993, now abandoned.

FIELD OF THE INVENTION

The present invention relates to novel catalysts and a method for using the catalysts to convert carbon sulfides and hydrogen cyanide.

BACKGROUND

Gases containing sulfur compounds and/or hydrogen cyanide are frequently encountered in industries wherein combustion furnaces are utilized. For example, the tail gas stream from a furnace carbon black production process generally contains carbon sulfides, such as carbon disulfide ($CS_2$) and carbonyl sulfide (COS), and also contains hydrogen cyanide (HCN).

Often it is desirable to remove the sulfur containing species from the gas stream to comply with laws and regulations regarding the emission of the species into the atmosphere. $CS_2$ and COS have a relatively inert chemical character and therefore can be difficult to remove from a gas stream. On the other hand, hydrogen sulfide ($H_2S$) may be readily removed from gas streams by a variety of processes. Sulfur in the form of carbon sulfides may be catalytically converted to $H_3S$; similarly, nitrogen fixed as HCN may be catalytically reacted to ammonia ($NH_3$). Typical commercial catalysts for these conversions include titania (titanium dioxide), cobalt and molybdenum promoted alumina (cobalt oxide and molybdenum trioxide/aluminum oxide), supported platinum and chromium oxide promoted alumina. These typical commercial catalysts may be effective in the absence of oxygen. However, in the presence of even small (approximately 0.1% or greater) concentrations of oxygen in the feed gas stream, these materials lose their desired catalytic function. For example, in the presence of oxygen, promoted alumina catalysts become sulfated and lose catalytic activity. With titania catalysts, small concentrations of oxygen may lead to conversion of sulfur species to $SO_2$ and/or COS, and poor carbon sulfide and HCN conversions.

In order to overcome the deletrious effects of oxygen on typically utilized catalysts, a dual stage catalyst bed has been suggested. For example, U.S. Pat. No. 4,981,661 discloses a two stage process wherein, in a first stage, oxygen is removed by hydrogenation and in a second stage the catalytic hydrolysis of carbon sulfides and HCN occurs. However, it would be advantageous to have a catalyst that would be effective for carbon sulfide and HCN conversion, even in the presence of oxygen, and therefore could be utilized in a single stage catalytic reactor.

It is an object of the present invention to provide novel catalysts. The catalysts are particularly effective for conversion of carbon sulfides and HCN, even in the presence of oxygen in concentrations up to 2% by volume (dry basis), preferably oxygen in concentrations up to 1.0% by volume, (dry basis). A further object of the present invention is a method for converting carbon sulfides and HCN of a gas stream utilizing the catalysts of the present invention.

SUMMARY OF THE INVENTION

We have discovered novel cobalt and molybdenum promoted titania, and nickel and molybdenum promoted titania catalysts and molybdenum promoted titania catalysts containing mixtures of cobalt and nickel. The catalysts are particularly effective for use in conversion of carbon sulfides and HCN, even in the presence of up to 2.0% by volume oxygen (dry basis). The catalyst comprises:

About 0.5 to about 5.0%, by weight, cobalt oxide (CoO) or nickel oxide (NiO), or mixtures thereof;

About 1.5 to about 15%, by weight, molybdenum trioxide ($MoO_3$); and

About 70 to about 98%, by weight, titanium dioxide ($TiO_2$).

Preferably, the catalyst comprises approximately 2.0 to about 3.5% CoO or NiO and about 8 to about 12% $MoO_3$. In practice, the minimum required CoO or NiO, and $MoO_3$ loading will depend on the concentration of oxygen in the gas to be treated; the greater the concentration of oxygen, the greater the percent of CoO or NiO, and $MoO_3$ required. The catalyst may be in any form known in the art. The catalyst may be produced in any manner known in the art, for example by impregnating titania pellets with aqueous solutions of salts of the promoter metals.

The method of the present invention comprises contacting a catalyst of the present invention with a gas stream containing carbon sulfides and/or HCN to convert the sulfur contained as carbon sulfides, and/or the nitrogen present as HCN into $H_2S$ and $NH_3$ respectively. The gas stream may contain up to 2 volume % oxygen (dry basis). The gas stream must also contain sufficient water vapor and/or hydrogen ($H_2$) to obtain catalytic conversion of carbon sulfides and/or HCN.

The catalysts of the present invention advantageously promote the conversion of sulfur present as carbon sulfides into hydrogen sulfide and of nitrogen in the form of HCN into ammonia and thereby reduce the levels of carbon sulfides and HCN in a gas stream. The catalysts of the present invention, and the method of the present invention, are particularly advantageous for use in catalyzing the conversion of the carbon sulfide and HCN components of the gas stream produced by a furnace carbon black reactor in the production of carbon blacks. Further details and advantages of the catalysts and method of the present invention are set forth in the following more detailed description of the invention.

BRIEF DESCRIPTION OF THE DRAWINGS

FIG. 1 is a graph of the catalytic conversion of $CS_2$, COS, and HCN utilizing a CoO—$MoO_3$ promoted titania catalyst of the present invention as described in Examples 2 and 3. Similarly FIG. 2 is a graph of the catalytic conversion of $CS_2$, COS, and HCN utilizing a NiO—$MoO_3$ promoted titania catalyst of the present invention as described in Examples 4 and 5.

DETAILED DESCRIPTION OF THE INVENTION

As set forth above, the present invention relates to specified cobalt and molybdenum promoted titania or nickel and molybdenum promoted titania catalysts and molybdenum promoted titania catalysts containing mixtures of cobalt and nickel. The invention also relates to a method for using the catalysts to convert sulfur in the form of carbon sulfides and nitrogen present as hydrogen cyanide to hydrogen sulfide and ammonia respectively. The catalysts of the present invention comprise:

About 0.5 to about 5.0%, by weight, cobalt oxide (CoO)

or nickel oxide (NiO), or mixtures thereof;

About 1.5 to about 15.0%, by weight, molybdenum trioxide ($MoO_3$); and

About 70 to about 98%, by weight, titanium dioxide ($TiO_2$).

Preferably, the catalyst comprises approximately 2.0 to about 3.5% CoO or NiO and about 8.0 to about 12.0% $MoO_3$. In practice, the minimum required level of the CoO or NiO, and $MoO_3$ will depend on the concentration of oxygen in the feed gas. The catalyst may be in any form known in the art.

The catalysts of the present invention may be produced in any manner known to the art. For example, the catalysts of the present invention may be produced by impregnating titania pellets with aqueous solutions of salts of the Co or Ni, and Mo promoter metals. A quantity of the promoter metal salt sufficient to produce the desired concentration of the promoter metal oxide in the catalyst is dissolved in approximately the amount of water required to match the absorption capability of the titania. The salt solution is slowly added to the titania, allowing time for the titania to absorb the solution. Solutions of each of the Mo and Co or Ni promoter metal salts may be separately and sequentially, added to the titania or the metal salts may be put into solution together and added to the titania. The impregnated titania is then dried. After drying, the promoter metal containing titania support is calcined in flowing air at increasingly higher temperatures to produce a catalyst of the present invention. A method for producing a catalyst of the present invention is described in more detail in Example 1 below.

The method of the present invention comprises contacting a catalyst of the present invention with a gas stream containing at least one component selected from the group consisting of carbon sulfides, such as $CS_2$ and COS, and HCN wherein the gas stream contains sufficient levels of water vapor and/or hydrogen to convert sulfur in the form of carbon sulfides, such as $CS_2$ and/or COS, into $H_2S$ and/or nitrogen present as HCN into $NH_3$. The gas stream may contain up to 2.0 volume % oxygen (dry basis).

More particularly, according to the method of the present invention the gas stream contacts a cobalt and molybdenum promoted titania catalyst or nickel and molybdenum promoted titania catalyst, or a molybdenum promoted titania catalyst containing mixtures of cobalt and nickel which comprises:

About 0.5 to about 5.0%, by weight, cobalt oxide (CoO) or nickel oxide (NiO), or mixtures thereof;

About 1.5 to about 15%, by weight, molybdenum trioxide ($MoO_3$); and

About 70 to about 98%, by weight, titanium dioxide ($TiO_2$).

Preferably the catalyst comprises about 2.0 to about 3.5%, by weight CoO or NiO and about 8 to about 12%, by weight $MoO_3$.

The method of the present invention may be performed in a single stage catalytic reactor containing a catalyst of the present invention. The design and size of the single stage catalytic reactor are within the skill of those of ordinary skill in the art and will depend on the properties of the gas stream containing the carbon sulfides and/or HCN components to be converted. In practicing the process, the carbon sulfide and/or HCN containing gas stream is fed into the catalytic reactor through pipes or similar means to contact the catalyst. The residence time and temperature in the catalytic reactor must be sufficient to ensure the desired conversions of carbon sulfides and HCN. If the gas stream contains insufficient water vapor or hydrogen, to effectuate the conversions, water may be introduced into the gas stream upstream of, or in, the catalytic reactor.

Further details of the catalyst and method of the present invention, and their advantages, will become apparent from the following Examples.

A Vacuum Generator MM8-805 process mass spectrometer was utilized to determine the composition of most of the gas streams referred to in the following Examples. The gas streams were dried, prior to introduction to the mass spectrometer, to approximately 2% water (by weight) using a Perma Pure dryer, manufactured by Perma Pure Products Incorporated of Toms River N.J. The concentrations of water in the gas streams were known from formulation and specie balances. The feed gas compositions in Examples 3 and 5 were calculated from the feed gas compositions in Examples 2 and 4 respectively and the rate of air addition used to introduce oxygen into the feed gas.

EXAMPLE 1

This example illustrates the production of a catalyst of the present invention.

A cobalt and molybdenum promoted titania catalyst of the resent invention was produced by the following procedure. LaRoche S701 titanium dioxide, a commercially available titania, sold by LaRoche Chemicals, Baton Rouge, La., was utilized for the catalyst support. First, the point of incipient wetness of the titania was determined by the following steps.

i. A paper towel was saturated with water and placed in a beaker. Three pieces of titania, approximately one cm in length and weighing a total of about 0.70 grams were placed in the beaker on top of the wet paper towel.

ii. The titania pieces were left on the saturated towel until the moisture was absorbed through the titania pieces and the top surfaces of the titania were wetted (approximately 2 hours).

iii. The titania pieces were then weighed to determine the amount of water absorbed per weight of titania.

The incipient wetness test described was performed three times and the mean quantity of water absorbed per weight of titania (mean point of incipient wetness) was determined to be 0.43 g water/g titania.

Next the titania support was impregnated with a cobalt and molybdenum containing solution. A final catalyst comprising 3.3% by weight CoO and 10%, by weight $MoO_3$ was desired. It was calculated that 75 g of the titania support would absorb about 32 ml of water. Therefore, a cobalt and molybdenum containing solution was prepared by dissolving 11.1 g of cobalt nitrate hexahydrate and 10.5 g of ammonium molybdate tetrahydrate in 32ml of water. The amounts of cobalt nitrate and ammonium molybdenum trioxide used to make the solution were determined from the chemical analyses provided with the metal salt reagents and by calculating the quantities of Co and Mo necessary to produce a final catalyst comprising 3.3% by weight CoO and 10% by weight $MoO_3$.

The cobalt and molybdenum containing solution was then slowly added to 75g of the titania support that was in the form of pellets smaller than approximately one half centimeter in diameter. The solution was added in a manner that allowed sufficient time for all of the solution to be absorbed into the pores of the titania.

The wet impregnated titania was then spread on a tray, allowed to dry overnight at room temperature, and then calcined by heating in flowing air. The calcining temperature was gradually raised from approximately 200° F. to 900° F. in the following manner to produce a cobalt and molybdenum promoted titania catalyst of the present invention:

| Temperature | Time at Temperature |
|---|---|
| 200° F. | 4 hours |
| 300° F. | 4 hours |
| 600° F. | 4 hours |
| 900° F. | 4 hours. |

EXAMPLE 2

This example illustrates the use of the catalyst of Example 1 in the method of the present invention. 47 cm$^3$ of the catalyst of the present invention produced in Example 1 was placed into a 2.8 cm diameter vertical quartz tube reactor. The reactor was sealed and connected to a feed gas supply so that the gas stream flowed into the reactor, through the catalyst bed and exited at the opposite end of the reactor. The feed gas and catalyst bed temperatures were maintained at 450° F. and the feed gas rate was controlled to give a 3600 hr$^{-1}$ gas hourly space velocity (GHSV).

The compositions of the gas streams entering and exiting the reactor were determined according to the procedures described herein. The results are set forth in Table 1 below:

TABLE 1

| | Gas Stream Composition | |
|---|---|---|
| Compound | Entering Stream | Exiting Stream |
| $CS_2$ (ppmv) | 355 | 10 |
| HCN (ppmv) | 390 | 13 |
| COS (ppmv) | 131 | 40 |
| $SO_2$ (ppmv) | 34 | 24 |
| $H_2S$ (ppmv) | 1,710 | 2,540 |
| $O_2$ (vol %) | 0.0 | 0.0 |
| $CH_4$ (vol %) | 0.5 | 0.5 |
| $CO_2$ (vol %) | 2.4 | 2.9 |
| CO (vol. %) | 10.3 | 10.1 |
| $H_2$ (vol. %) | 11.3 | 11.9 |
| $N_2$ (vol. %) | 40.2 | 40.0 |
| $H_2O$ (vol. %) | 35.0 | 34.4 | vol. % = volume percentage; ppmv = volume parts per million.

These results are shown graphically in FIG. 1. Between times 0.0 and 0.4 hours FIG. 1 shows the reactor feed gas composition. Beginning at 0.4 hours the feed gas was passed through the catalyst bed and the reactor exit gas concentrations of $CS_2$, HCN, and COS are substantially reduced compared to their concentrations in the feed gas. The results provided in Table 1 and FIG. 1 indicate that the catalyst of Example 1 effectively catalyzed the conversion of the $CS_2$, COS, and HCN components in the feed gas. The percent conversions of $CS_2$, COS, and HCN were calculated from the results in Table 1 and are shown in Table 2 below.

TABLE 2

| % Conversions | |
|---|---|
| $CS_2$ | 97 |
| HCN | 96 |
| COS | 69 |

These results indicate that the method and catalysts of the present invention are advantageous for use in converting $CS_2$, COS, and HCN.

EXAMPLE 3

This example illustrates that the catalyst of Example 1 and method of the present invention are effective, even when oxygen is present in the feed gas. The same catalyst and reactor charge described in Example 2 were used. However in this example, the feed gas contained 0.32% oxygen.

The compositions of the gas streams entering and exiting the reactor were determined according to the procedures described herein. The results are set forth in Table 3 below:

TABLE 3

| | Gas Stream Composition | |
|---|---|---|
| Compound | Feed Stream | Reactor Exit Stream |
| $CS_2$ (ppmv) | 350 | 11 |
| HCN (ppmv) | 285 | 14 |
| COS (ppmv) | 134 | 45 |
| $SO_2$ (ppmv) | 33 | 25 |
| $H_2S$ (ppmv) | 1,680 | 2,640 |
| $O_2$ (vol. %) | 0.3 | 0.0 |
| $CH_4$ (vol. %) | 0.5 | 0.5 |
| $CO_2$ (vol. %) | 2.4 | 3.4 |
| CO (vol. %) | 10.1 | 9.6 |
| $H_2$ (vol. %) | 11.1 | 11.9 |
| $N_2$ (vol. %) | 41.0 | 40.8 |
| $H_2O$ (vol. %) | 34.4 | 33.6 | vol. % = volume percentage; ppmv = volume parts per million.

These results are also shown graphically in FIG. 1. At time 2.8 hours, 0.32% oxygen (0.5% on dry basis) was injected into the feed gas. Essentially no change in the composition of the reactor exit stream is observed. The catalyst effectively promoted the conversion of $CS_2$, COS, and HCN. The results provided in Table 3 and FIG. 1 indicate that the catalyst of Example 1 effectively promoted the conversion of the $CS_2$, COS, and HCN components of the feed gas stream, even in the presence of oxygen. The percent conversions of $CS_2$, COS, and HCN were calculated from the results in Table 3 and are shown in Table 4 below.

TABLE 4

| % Conversions | |
|---|---|
| $CS_2$ | 97 |
| HCN | 95 |
| COS | 66 |

These results indicate that the method of the present invention and catalyst of Example 1 are advantageous for use in converting the $CS_2$, COS and HCN components of a gas stream, even when oxygen is present in the gas stream.

EXAMPLE 4

This example illustrates the use of another catalyst of the present invention in the method of the present invention. The catalyst comprised 2.5% NiO, 9.0% $MoO_3$, and balance titania (LaRoche S701). The catalyst was prepared by the impregnation process described in Example 1, except that nickel nitrate hexahydrate was used in place of cobalt nitrate hexahydrate and the quantities of the metal salts used were adjusted to yield the desired loadings of NiO (2.5% by weight) and $MoO_3$ (9.0% by weight). 47 cm$^3$ of this catalyst was placed into a 2.8 cm diameter vertical quartz tube reactor. The reactor was sealed and connected to a feed gas supply so that the gas stream flowed into the reactor, through the catalyst bed and exited at the opposite end of the reactor. The feed gas and catalyst bed was controlled to give a 3600 hr⁻¹ GHSV.

The compositions of the feed gas streams entering and exiting the reactor were determined according to the procedures described herein. The results are set forth in Table 5 below:

TABLE 5

| Compound | Gas Stream Composition | |
|---|---|---|
| | Entering Stream | Exiting Stream |
| $CS_2$ (ppmv) | 320 | 8 |
| HCN (ppmv) | 300 | 11 |
| COS (ppmv) | 150 | 51 |
| $SO_2$ (ppmv) | 40 | — |
| $H_2S$ (ppmv) | 1,750 | 3,000 |
| $O_2$ (vol. %) | 0.0 | 0.0 |
| $CH_4$ (vol. %) | 0.5 | 0.5 |
| $CO_2$ (vol. %) | 2.3 | 3.4 |
| CO (vol. %) | 10.3 | 9.3 |
| $H_2$ (vol. %) | 11.0 | 12.0 |
| $N_2$ (vol. %) | 40.6 | 40.5 |
| $H_2O$ (vol. %) | 35.0 | 34.0 | vol. % = volume percentage; ppmv volume parts per million.

These results are shown graphically in FIG. 2. Between times 0.0 and 0.35 hours, FIG. 2 shows the reactor feed gas composition. Beginning at 0.35 hours the feed gas was passed through the catalyst bed and the reactor exit gas concentrations of $CS_2$, HCN, and COS are substantially reduced compared to their concentrations in the feed gas. The results provided in Table 5 and FIG. 2 indicate that the catalyst of this Example effectively catalyzed the conversion of the $CS_2$, COS, and HCN components in the feed gas. The percent conversions of $CS_2$, COS, and HCN were calculated from the results in Table 5 and are shown in Table 6 below.

TABLE 6

| | % Conversions |
|---|---|
| $CS_2$ | 97 |
| HCN | 96 |
| COS | 66 |

These results indicate that the catalyst of this Example and the method of the present invention are advantageous for use in converting $CS_2$, COS, and HCN.

EXAMPLE 5

This example illustrates that the catalyst of Example 4 and the method of the present invention are effective even when oxygen is present in the feed gas. The same catalyst and reactor charge described in Example 4 were used. However in this example the feed gas contained 0.32% oxygen.

The compositions of the gas streams entering and exiting the reactor were determined according to the procedures described herein. The results are set forth in Table 7 below:

TABLE 7

| Compound | Gas Stream Composition | |
|---|---|---|
| | Feed Stream | Reactor Exit Stream |
| $CS_2$ (ppmv) | 315 | 8 |
| HCN (ppmv) | 295 | 10 |
| COS (ppmv) | 148 | 51 |
| $SO_2$ (ppmv) | 40 | — |
| $H_2S$ (ppmv) | 1,722 | 3,000 |
| $O_2$ (vol. %) | 0.32 | 0.0 |
| $CH_4$ (vol. %) | 0.5 | 0.5 |

TABLE 7-continued

| Compound | Gas Stream Composition | |
|---|---|---|
| | Feed Stream | Reactor Exit Stream |
| $CO_2$ (vol. %) | 2.3 | 4.0 |
| CO (vol. %) | 10.1 | 8.6 |
| $H_2$ (vol. %) | 10.8 | 12.1 |
| $N_2$ (vol. %) | 41.3 | 41.3 |
| $H_2O$ (vol. %) | 34.4 | 33.2 | vol. % = volume percentage; ppmv = volume parts per million.

These results are also shown graphically in FIG. 2. At time 3.4 hours, 0.32% oxygen (0.5% dry basis) was injected into the feed gas. Essentially no change in the composition of the reactor exit stream is seen. The results provided in Table 7 and FIG. 2 indicate that the catalyst of this Example effectively promoted the conversion of the $CS_2$, COS, and HCN components of the feed gas stream even in the presence of oxygen. The percent conversions of $CS_2$, COS, and HCN were calculated from the results in Table 7 and are shown in Table 8 below:

TABLE 8

| | % Conversions |
|---|---|
| $CS_2$ | 97 |
| HCN | 96 |
| COS | 67 |

These results indicate that the method of the present invention and catalyst of this Example are advantageous for use in converting the $CS_2$, COS and HCN components of a gas stream even when oxygen is present in the gas stream.

It should be clearly understood that the forms of the present invention herein described are illustrative only and are not intended to limit the scope of the invention.

We claim:

1. A method comprising contacting a gas stream containing at least one component selected from the group consisting of a carbon sulfide and hydrogen cyanide with a catalyst comprising a metal oxide selected from the group consisting of cobalt oxide (CoO), nickel oxide (NiO), or mixtures thereof, in an amount ranging from about 0.5 to about 5.0% by weight; molybdenum trioxide ($MoO_3$) in an amount ranging from about 1.5 to about 15% by weight; and titanium dioxide ($TiO_2$) in an amount ranging from about 70 to 98% by weight, wherein the gas stream contains a sufficient amount of water vapor and/or hydrogen to convert carbon sulfides to hydrogen sulfide and hydrogen cyanide to ammonia.

2. A method as described in claim 1 wherein the metal oxide is present in an amount ranging from about 2.0 to about 3.5% by weight, and the molybdenum trioxide ($MoO_3$) is present in an amount ranging from about 8.0 to about 12.0% by weight.

3. A process as described in claim 1 wherein the carbon sulfide is selected from the group consisting of carbon disulfide ($CS_2$) and carbonyl sulfide (COS).

4. A process as described in claim 1 wherein the gas stream additionally contains up to 2.0 volume % oxygen (dry basis).

5. A process as described in claim 1 wherein the gas stream additionally contains up to 1.0 volume % oxygen (dry basis).

6. A process as described in claim 1 wherein the gas stream contains water vapor and hydrogen.

\* \* \* \* \*